(12) United States Patent  
Dobbs et al.

(10) Patent No.: US 9,105,196 B2  
(45) Date of Patent: Aug. 11, 2015

(54) METHOD AND SYSTEM FOR AUTONOMOUS TEACHING OF BRAILLE

(75) Inventors: Glen Dobbs, Woodbury, CT (US); Kevin Miller, Unionville, CT (US)

(73) Assignee: PROXTALKER.COM, LLC, Waterbury, CT (US)

( * ) Notice: Subject to any disclaimer, the term of this patent is extended or adjusted under 35 U.S.C. 154(b) by 707 days.

(21) Appl. No.: 12/982,737

(22) Filed: Dec. 30, 2010

(65) Prior Publication Data

US 2012/0171645 A1  Jul. 5, 2012

Related U.S. Application Data

(63) Continuation-in-part of application No. 12/802,996, filed on Jun. 17, 2010, which is a continuation-in-part of application No. 11/180,061, filed on Jul. 13, 2005.

(60) Provisional application No. 60/589,910, filed on Jul. 20, 2004.

(51) Int. Cl.
　　*G09B 19/00*　　(2006.01)
　　*G09B 19/24*　　(2006.01)
　　*G09B 21/00*　　(2006.01)

(52) U.S. Cl.
　　CPC .............. *G09B 19/00* (2013.01); *G09B 19/24* (2013.01); *G09B 21/007* (2013.01)

(58) Field of Classification Search
　　USPC ........................................................ 434/113
　　See application file for complete search history.

(56) References Cited

U.S. PATENT DOCUMENTS

| 4,465,465 A | 8/1984 | Nelson |
| 4,681,548 A | 7/1987 | Lemelson |
| 4,785,420 A | 11/1988 | Little |
| 4,969,096 A | 11/1990 | Rosen et al. |
| 4,980,919 A | 12/1990 | Tsai |
| 5,154,614 A | 10/1992 | Matsuoka et al. |
| 5,161,975 A | 11/1992 | Andrews |
| 5,169,342 A | 12/1992 | Steele et al. |
| 5,188,533 A | 2/1993 | Wood |
| 5,433,610 A | 7/1995 | Godfrey et al. |
| 5,520,544 A | 5/1996 | Manico et al. |
| 5,556,283 A | 9/1996 | Stendardo et al. |
| 5,557,269 A | 9/1996 | Montane |
| 5,574,519 A | 11/1996 | Manico et al. |
| 5,725,379 A | 3/1998 | Perry |
| 5,813,861 A | 9/1998 | Wood |
| 5,851,119 A | 12/1998 | Sharpe, III et al. |
| 5,895,219 A | 4/1999 | Miller |

(Continued)

*Primary Examiner* — Kesha Frisby
(74) *Attorney, Agent, or Firm* — Andrew F. Young, Esq.; Lackenbach Siegel, LLP (57) ABSTRACT

The present invention is a method and system for autonomous learning of Braille by an unsighted user. The system allows the unsighted user to pass a card over an RFID reader so as to trigger an audible response that is indicative of an indicia (Braille word or character) embossed on the card. The embossed card further comprises an RFID tag and a series of raised indicia surfaces representative of a Braille-based word or character. The tag transmits a signal indicative of the word or character to the receiving (via receiver) micro-controller which will convert the signal to an audible tone to be transmitted through an output device. The system has a memory which holds a library of tones corresponding to a signal to be converted. An autonomous record mode allows the system user to record an audio input to be stored in the library, or utilize an interface port, or removable memory, for downloading an input.

22 Claims, 6 Drawing Sheets

(56) References Cited

U.S. PATENT DOCUMENTS

| | | |
|---|---|---|
| 5,902,112 A | 5/1999 | Mangold |
| 5,954,514 A | 9/1999 | Haas et al. |
| 6,056,549 A | 5/2000 | Fletcher |
| 6,068,485 A | 5/2000 | Linebarger et al. |
| 6,072,980 A | 6/2000 | Manico et al. |
| 6,363,239 B1 | 3/2002 | Tutt et al. |
| 6,464,503 B1 | 10/2002 | Heit et al. |
| 6,525,706 B1 | 2/2003 | Rehkemper |
| 6,650,870 B2 | 11/2003 | White et al. |
| 6,661,407 B2 | 12/2003 | Severson |
| 6,977,579 B2 * | 12/2005 | Gilfix et al. ............... 340/407.1 |
| 7,066,781 B2 | 6/2006 | Weston |
| 7,556,444 B2 | 7/2009 | Kurashina et al. |
| 7,744,372 B1 | 6/2010 | Minnich et al. |
| 7,812,979 B2 | 10/2010 | Takada et al. |
| 7,830,260 B2 * | 11/2010 | Wang et al. ............... 340/572.1 |
| 2002/0193047 A1 | 12/2002 | Weston |
| 2003/0022143 A1 | 1/2003 | Kirwan |
| 2003/0225570 A1 * | 12/2003 | Boys ............................... 704/3 |
| 2004/0186713 A1 | 9/2004 | Gomas et al. |
| 2004/0219501 A1 | 11/2004 | Small et al. |
| 2006/0134586 A1 * | 6/2006 | Armingaud et al. .......... 434/113 |

\* cited by examiner

METHOD AND SYSTEM FOR AUTONOMOUS TEACHING OF BRAILLE

CROSS REFERENCE TO RELATED APPLICATIONS

This application relates to, and claims priority from: U.S. application Ser. No. 12/802,996 for an Interactive Speech Synthesizer For Enabling People Who Cannot Talk But Who Are Familiar With Use Of Anonym Moveable Picture to Communication To Autonomously Communicate Using Verbal Language, filed Jun. 17, 2010; U.S. application Ser. No. 11/180,061 for an Interactive Speech Synthesizer For Enabling People Who Cannot Talk But Who Are Familiar With Use Of Anonym Moveable Picture Communication To Autonomously Communicate Using Verbal Language, filed Jul. 13, 2005; and, U.S. Application Ser. No. 60/589,910 for a Picture Exchange Binder With Talking Box—the entire contents of each of which is herein incorporated fully by reference.

FIGURE FOR PUBLICATION

FIG. 3.

BACKGROUND OF THE INVENTION

1. Field of the Invention

The present invention relates to method and system for autonomous learning of Braille by an unsighted user. More specifically, the present invention relates to a hand-held system that allows the user to pass a card over an RFID reader so as to trigger an audible response that is indicative of a Braille indicia (word or character) embossed on the card. The embossed card further comprises an RFID tag and a series of raised indicia (surfaces) representative of a Braille-based word or character.

2. Description of the Related Art

The related art involves the fields of Braille teaching in general, and small, desk-based systems for interactive learning in particular.

Braille was developed in the early $19^{th}$ Century as a method of permitting the blind to read text. The system uses characters or "cells" which are comprised of six dots arranged in a rectangular pattern. The pattern has two columns of three dots each. A dot is "raised" at one or more of the six positions so as to form sixty-four possible characters (representing letters and punctuation), including a null pattern wherein none of the dots are raised. Lines of Braille text are separated by a space.

Braille can be "printed" by an embossing printer, which is generally an impact printer which causes the dots to be raised to indicate the character needed to represent Braille text.

In Grade 1 Braille, characters can be transcribed by substituting a Braille character for its printed equivalent. This type of transcription is generally utilized by beginning learners of the Braille system. Grade 2 Braille, on the other hand, utilizes a system of contractions to reduce the space necessary to layout the otherwise large Braille characters. Grade 3 Braille includes additional contraction sets, and is generally used by individuals for personal convenience. Grade 3 Braille is not generally used for mass publication.

Language specific Braille (English, French, Japanese, etc.) is based on a substitution of local characters for their Braille equivalents.

Past systems for teaching Braille have included Speech Assisted Learning (SAL) devices guided by sighted-instructors for a non-sighted student that provided a means for teaching mathematics through an interactive tool (Talking Tactile Tablets) that provided audio confirmation of selected words or symbols in a document. These systems proved to be limited in flexibility, mandated the use of a sighted instructor for comprehensive learning, and were pre-packaged so that additional downloads of both physical speech and computer-based files developed by the system user could not be readily achieved.

What is not appreciated by the prior art is the need to provide a flexible autonomous means for learning Braille, or its equivalents, by unsighted users.

Accordingly, there is a need for an improved method and system for allowing an unsighted user a convenient means for learning Braille without the need for a sighted tutor's physical presence, the need for a computer, or the need for external power portability.

ASPECTS AND SUMMARY OF THE INVENTION

An aspect of the present invention is to provide an improved method and system for allowing an unsighted user a convenient and flexible means for learning Braille without the need for a tutor's physical presence. A further system for teaching the unsighted to read includes the Moon alphabet, which consists of embossed shapes which can be read by touch. Both the Braille and Moon systems are adaptable to the present invention.

Another aspect of the present invention is to provide an energy efficient means for powering the system.

Still another aspect of the present invention is to provide a means for expanding the library of tones (where tones are building blocks which are indicative of sounds, words, or partial words) which correspond to pre-manufactured embossed labels as well as to accommodate the addition of new tones to the device through direct recording or by way of downloading through a port, and which are accessible by locally produced embossed cards.

Flexibility is a key component to learning because not all students progress or adapt at the same rate. Therefore, a system that provides a simple method for tracking the use of "flash cards" to be used in teaching Braille configured words, phrases or symbols is extremely important for autonomous learning. Such autonomous learning methods have not been presented in the past. Additionally, a system that recognizes that cards containing certain words or phrases may need to be available on "as needed" basis, and provides the means for creating new cards as required, provides the flexibility required for autonomous learning. The system further provides the ability to record directly or download new audio files which, in turn, correspond to new words or characters to be learned by the non-sighted system user, or can simply be new instructions for greater learning potential.

The present invention relates to a method and system for autonomous learning of Braille by an unsighted user. The system allows the user to pass a card over an RFID reader so as to trigger an audible response that is indicative of a Braille word or character embossed on the card. There are several methods of reading the cards which include, but are not limited to: presentation of the tag to the reader; pressing the activation button; magnetically closing a switch; by capacitively detecting the presence of the card; and, by optically detecting the presence of the card.

The embossed card further comprises an RFID tag and a series of raised surfaces representative of a Braille-based word or character. The tag transmits a signal indicative of the word or character to the micro-controller which will convert the signal to an audible tone to be transmitted through an output device. The system has a memory which holds a library of tones corresponding to a signal to be converted. A record mode allows the system user to record an audio input which can be stored in the library, or to utilize an interface port for downloading an input. Various methods of recording include, but are not limited to: the use of the on-board microphone; use of a sound card; use of the interface port; wireless transmission of data; and, infra-red transmission of data.

According to an embodiment of the present invention, there is provided a method and system for autonomous learning of Braille by an unsighted user. The system utilizes a hand-held housing which integrates a number of components to allow the system user to pass a card over an RFID reader so as to trigger an audible response from the system that is indicative of a Braille word or character embossed on the card. Each one of the plurality of embossed cards comprises a further identifying embossed character, so that the cards can be readily identified.

The method of learning comprises a number of steps which include activating the micro-controller-based system by use of an activation button. An embossed card is selected from among a plurality of embossed cards. Each of the embossed cards further comprises a series of raised surfaces, wherein the raised surfaces are representative of a Braille-based word or character. Additionally, the embossed card includes an RFID tag which is capable of transmitting a signal indicative of the Braille-based word or character.

The embossed tag is passed over an RFID reader causing the RFID tag to be read. Additionally, a button, or other switch, can be used to cause the reader to activate when the button or switch is pressed. The reading is transmitted as a coded signal from the reader to the micro-controller. Under control of a Braille software application, the micro-controller will convert the coded signal to an audible tone; and, transmit the audible tone through an audio output device for reception by the unsighted system user. Audio output devices can include, but are not limited to: an embedded speaker; at least one headphone (wired or wireless); a remote speaker; at least one earbud; a Bluetooth device; or, any standard audio device utilizing a standard mono audio jack.

The micro-controller-based system further comprises a memory which holds a library of pre-recorded tones, each of the pre-recorded tones corresponding to a coded signal to be converted. Additionally, the system has an audio input means (i.e., a microphone). A record mode, activated by passing a "record mode" card over the RFID reader allows the system user to record an audio input; the audio input being stored in the library as a pre-recorded tone. Further, the system may have a data input (i.e., an interface port resident in the battery compartment on the rear of the housing, and/or a removable memory storage device or component) so as to enable downloading an audio input, through the input port; the audio input being stored in the library as a pre-recorded tone.

The system utilizes battery power to support the power needs of the system. In order to prolong battery life, the system provides power management means. The power management means interfaces with the power supply disposed within the micro-controller based system, so as to conserve power by placing the system in a "sleep mode" until activated.

The above, and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 1A:
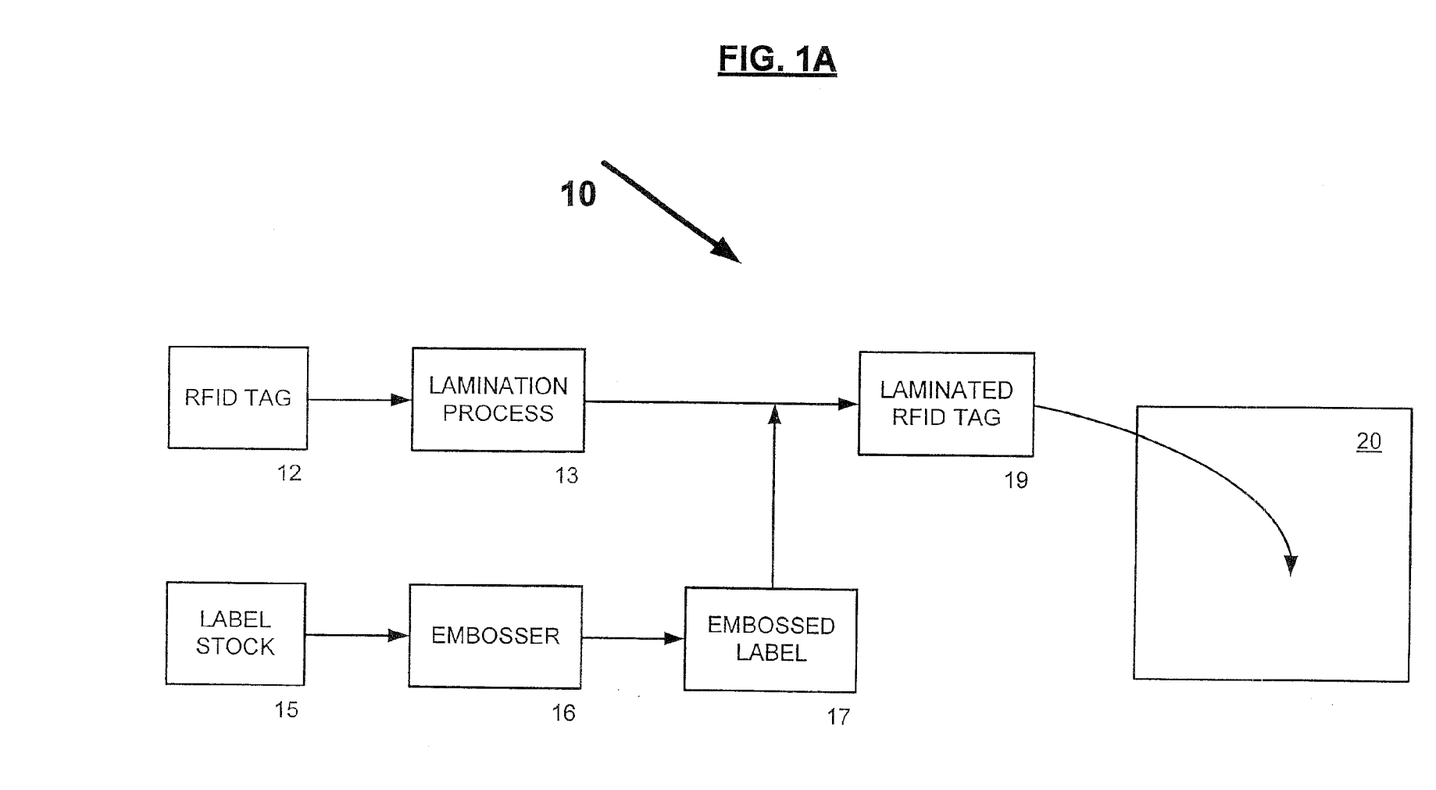
FIG. 1A is an overview diagram of the method flow through the key components of the present invention.

Turning first to FIG. 1A, there is shown an overview diagram of the method flow through the key components of the present invention, wherein a card or label stock 14 has a radio frequency identification tag (RFID) 12 joined therewith in use. The RFID tag 12 emits a unique identifiable signal that will correspond to the word or phrase to be embossed on the card, as will be discussed below. The method and system can be utilized with any of the three grades of Braille, as well as the Moon alphabet system.

As depicted, the label stock is passed through an embosser 16 which will emboss the indicia onto the label. The embossed label is then applied to the surface of the RFID card. The newly embossed label 18 can then be passed over a reader of the system housing 20, as will be discussed in detail below. The system 20 will be described in more detail in FIG. 1B.

Figure 1B:
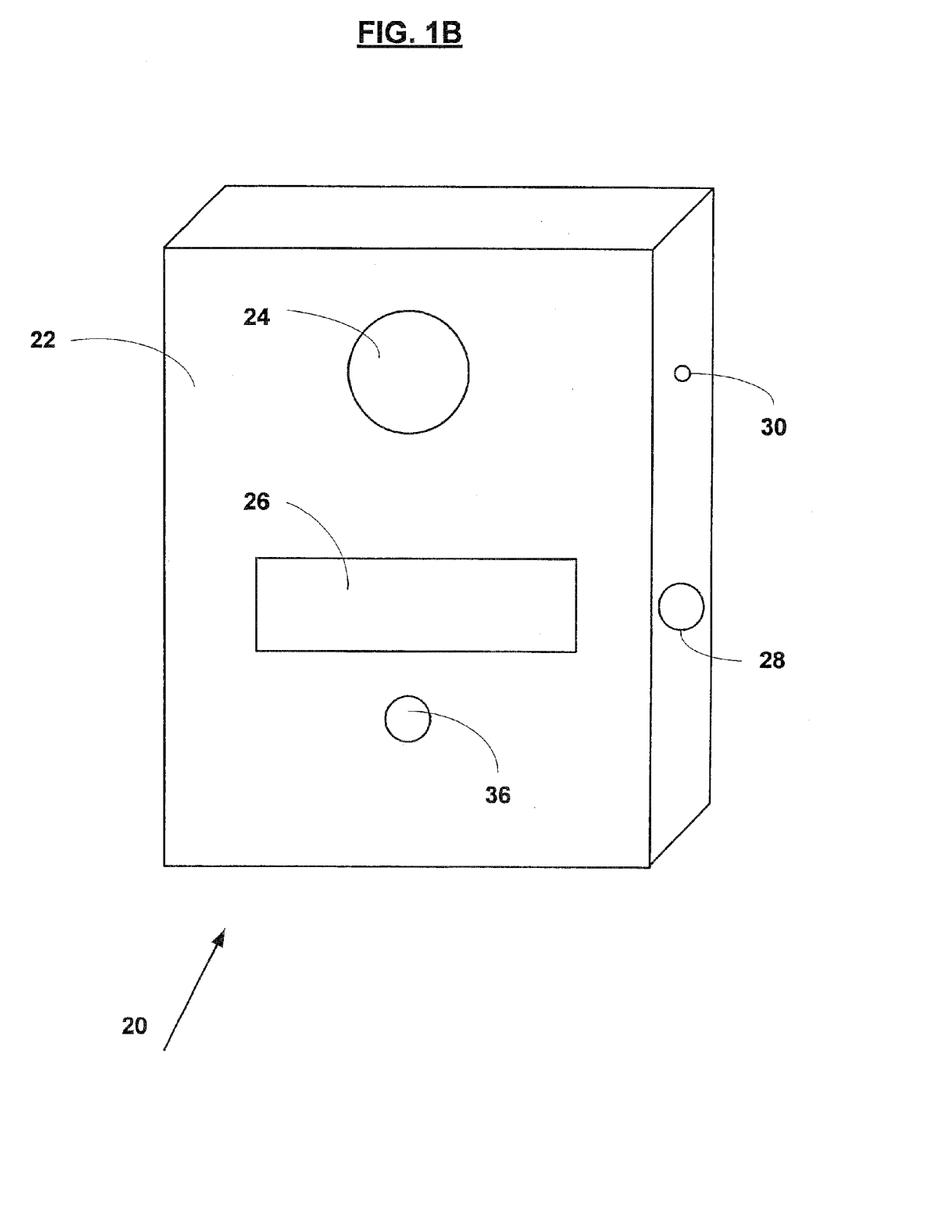
FIG. 1B is an upper level illustration of a front of the housing for the system of the present invention.

Turning then to FIG. 1B, there is shown an upper level depiction of the front of the housing for the system of the present invention.

The Braille learning system 20 comprises a housing 22, an audio output component 24 and an audio input component 36. The audio output component 24 is a speaker which provides an audible tone to the system user. As an alternative, the user can plug a headset, earbuds, or an external speaker into the audio output jack 30. Each of the audio output devices can be configured in several ways (single speaker headphone, one earbud, multiple speakers, Bluetooth device, etc.) and their use is not limited hereby. The audio input component 36 is a microphone; however, additional audio input devices or file downloads are possible through an interface port 37 (such as a USB port) or, in the alternative, a removable memory storage media mounted in the battery compartment 32 in the rear of the housing 22 and as shown in FIG. 1F.

Additionally, the Braille learning system 20 further comprises an activation means such as an action button or switch 28 which "wakes up" the device and allows the reading process to be activated. Further, the system 20 has an RFID reader mounted on the front face thereof which allows the system user to pass an embossed card over the reader so that the system can convert the RFID signal to a stored audio tone for output through the audio output component 24 or the audio output jack 30. The card can be used to trigger or perform a function (see the cards depicted in FIGS. 1C through 1F and described below).

Figure 1C:
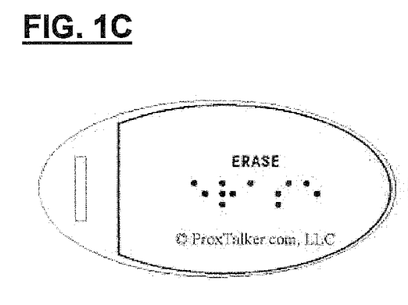
FIG. 1C is a depiction of a first exemplary embossed program card secured to a separate RFID tag having a unique identifier and capable of providing direction within the method and system of the present invention.

FIG. 1C is a depiction of a first exemplary program card capable of providing direction or function within the method and system of the present invention. Generally, in a preferred embodiment of the present invention, program cards are employed which have a flat edge offsetting an ovoid shape. The shape of the cards is important in distinguishing them from learning cards which are rectangular in shape.

In the case of the "ERASE" tag depicted in FIG. 1C, the card has the function imprinted in standard English above the embossed raised characters which indicate the function in the corresponding Braille encoding scheme. The card can be passed over the RFID reader 26 so as to allow the system 20 to perform the function noted. For instance, in the case of a tag that has been customized with a new sound or series of tones, the ERASE tag is used to return the tag to its original sound. By way of example—If the phrase "This is the letter A" is recorded over the stock sound or tones found on the "A" tag, the user will hear the phrase "This is the letter A". If the user wants to to return to the original "A" sound or tone, then the user presses the ERASE tag followed by the customized "A" tag to the RFID reader 26. At this point, the custom recording has been removed and when the "A" tag is used it will cause the originally programmed sound or tone to be emitted.

Figure 1D:
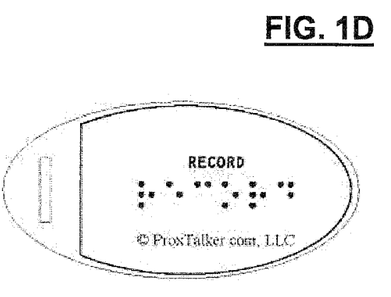
FIG. 1D is a depiction of a second exemplary program card capable of providing direction within the method and system of the present invention.

It is important to note, that both the RECORD and ERASE tags function in the above described manner the function tag is presented to the RFID reader and is then followed by pressing the tag that the user wishes to customize or to restore, as the case may be.

FIG. 1D is a depiction of a second exemplary program card capable of providing direction or function within the method and system of the present invention. In the case of the "RECORD" card depicted in FIG. 1D, the card has the function imprinted in standard English above the embossed raised characters which indicate the function in the corresponding Braille encoding scheme. The card can be passed over the RFID reader 26 so as to allow the system 20 to perform the function noted. In this case, the RECORD function will cause the system to record the word or phrase to be associated with the card subsequently presented to the RFID reader 26.

Figure 1E:
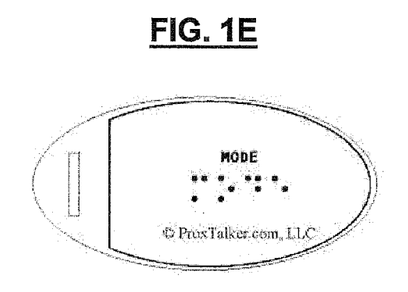
FIG. 1E is a depiction of a third exemplary program card capable of providing direction within the method and system of the present invention.
Figure 1F:
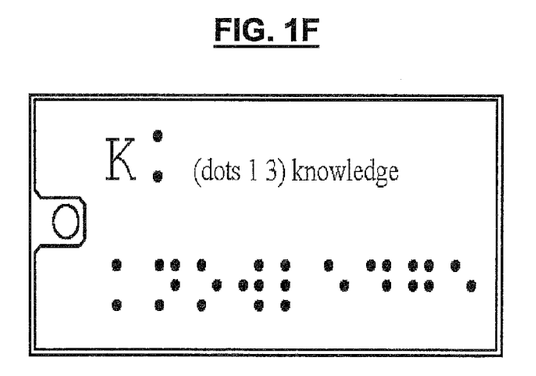
FIG. 1F is a depiction of an exemplary embossed "flash" card joined to an RFID tag and capable of autonomous teaching within the method and system of the present invention.

FIG. 1E is a depiction of a third exemplary program card capable of providing direction or function within the method and system of the present invention is the "MODE" card (not shown). This card allows the system to interpret grade 1 versus grade 2 Braille. Thus, there are possible multiple voice outputs for each embossed tag based on the mode position (1, 2 or 3). Mode 1 allows the use of letters and dot positions within grade 1 for beginning users of Braille. Mode 2 allows the use of letters only within grade 1; and, mode 3 allows the use of letters and words within grade 2.

FIG. 1F is a depiction of an exemplary "flash" card capable of providing autonomous teaching or learning within the method and system of the present invention. In the case of the "K" card depicted in FIG. 1F, the card has the letter to be learned or practiced imprinted in standard English adjacent to the embossed raised letter in the corresponding Braille encoding scheme. The card can be passed over the RFID reader 26 so as to allow the system 20 to emit an audible tone corresponding to the word "knowledge". Thus, the system user can learn that the word "knowledge" is associated with a particular pattern of Braille coding.

Figure 1G:
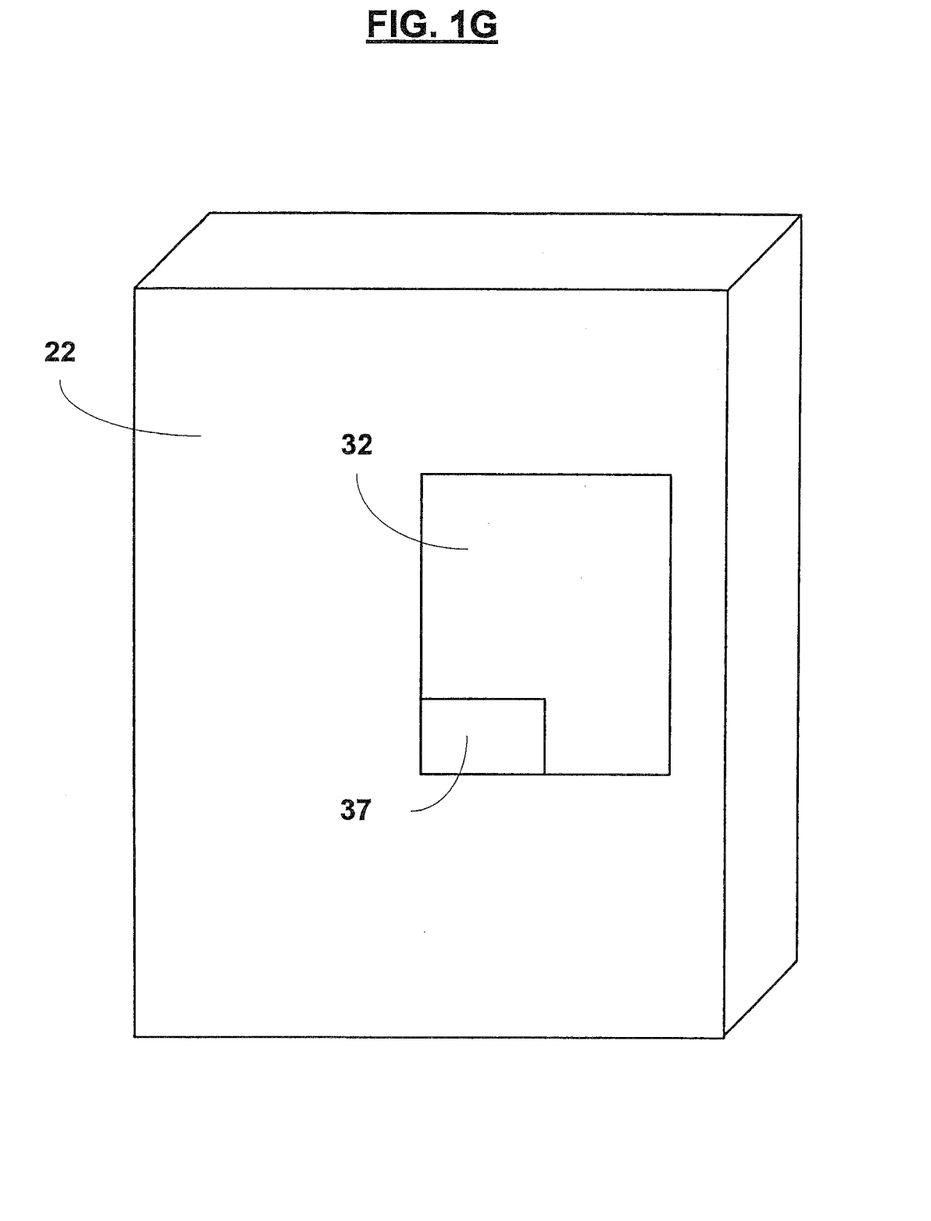
FIG. 1G is an upper level depiction of the rear of the housing for the system of the present invention.

Returning then to the housing 22 of the system 20, FIG. 1G, is an upper level depiction of the rear of the housing 22 for the system of the present invention.

The Braille learning system 20 comprises a housing 22, with a battery compartment 32. The battery compartment 32 has a door or covering (not shown) which secures the batteries within the compartment. Within the battery compartment 32, is an interface port (such as a USB) or, in the alternative, a removable memory storage device, which allows the system 20 to accept downloads.

Figure 2:
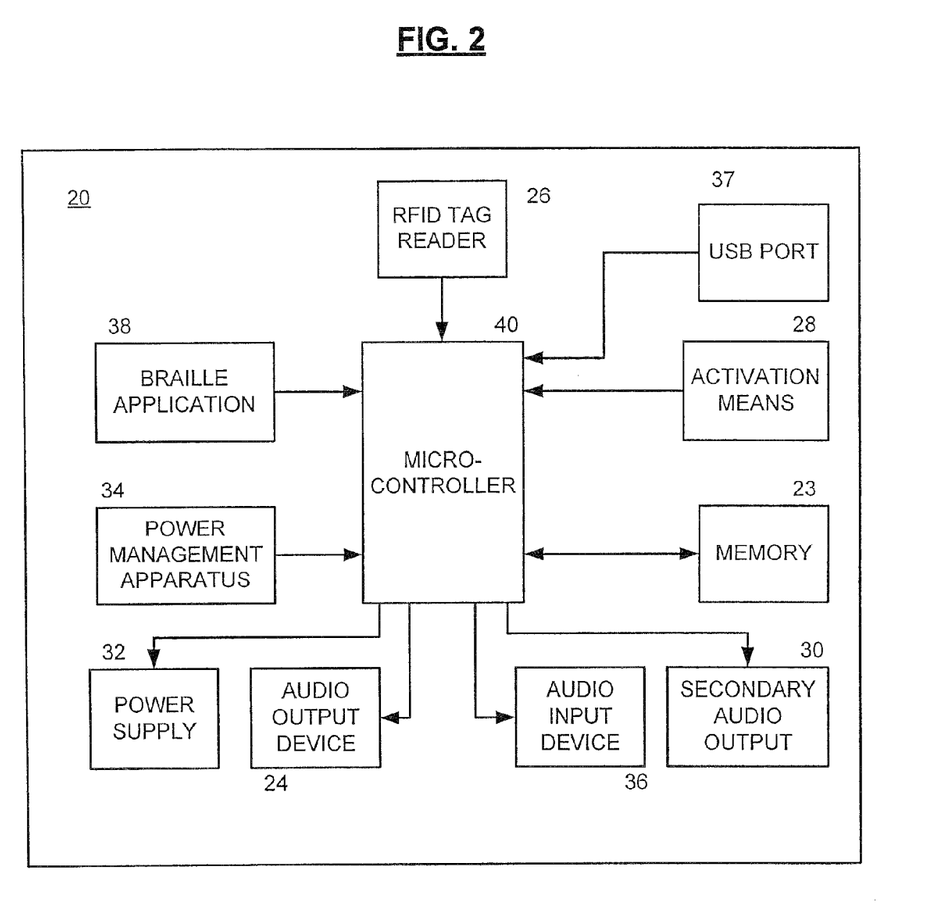
FIG. 2 is a block diagram of the system of the present invention.

Turning then to FIG. 2, there is shown a block diagram of the system of the present invention.

The Braille learning system 20 has a micro-controller 40, an RFID tag reader 26, and an audio output device 24 (such as a speaker). The micro-controller 40, the RFID tag reader 26, and the audio output device 24 are disposed within a housing 22. The RFID tag reader 26 reads data from an associated encoded card (see FIGS. 1C through 1F), to form a coded signal and transmits the coded signal to the micro-controller 40 that looks up a sound file, located in memory 23, corresponding to the coded signal and sends the sound file to the audio output device 24 to convert into sound, thereby allowing a sound corresponding to the to selected card to be produced to thereby generate, automatically, unique audible information associated with the data of each encoded card. A secondary audio output 30 allows peripheral audio devices such as an external speaker or speakers, a headphone, or earbuds to be plugged into a jack for conveying the audio signal.

The Braille learning system 20 further comprises a memory 23. The memory 23 is disposed within the housing 22 and stores the sound files, by addresses, to be looked up by the micro-controller 40. The Braille learning system 20 additionally comprises activation means (preferably a switch) 28. The activation apparatus 28 is disposed within the housing 22, and when activated, activates the micro-controller 40 and the RFID tag reader 26 to read the data from an associated encoded card, thereby triggering the sounds. The micro-controller 40 works in conjunction with a Braille reading application 38 that provides direction to the micro-controller 40 in the form of instructions.

The Braille learning system 20 further comprises power management apparatus 34. The power management apparatus 34 is disposed within the housing and is for interfacing with a power supply 32 (preferably batteries), and conserves power by allowing the Braille learning system 20 to remain in sleep mode until the activation apparatus 28 is activated.

Further, the Braille learning system 20 comprises an interface port 37 or removable memory storage media. The interface port 37 is disposed within the battery compartment 32 in the rear of the housing 22 and is for downloading new sound bit files into the memory 23; or, for allowing peripheral interface. Additionally, there is provided within the system 20 an audio input 36 (such as a microphone). The audio input 36 is disposed within the housing 22 and is for recording new sound bit files into the memory 23.

Figure 3:
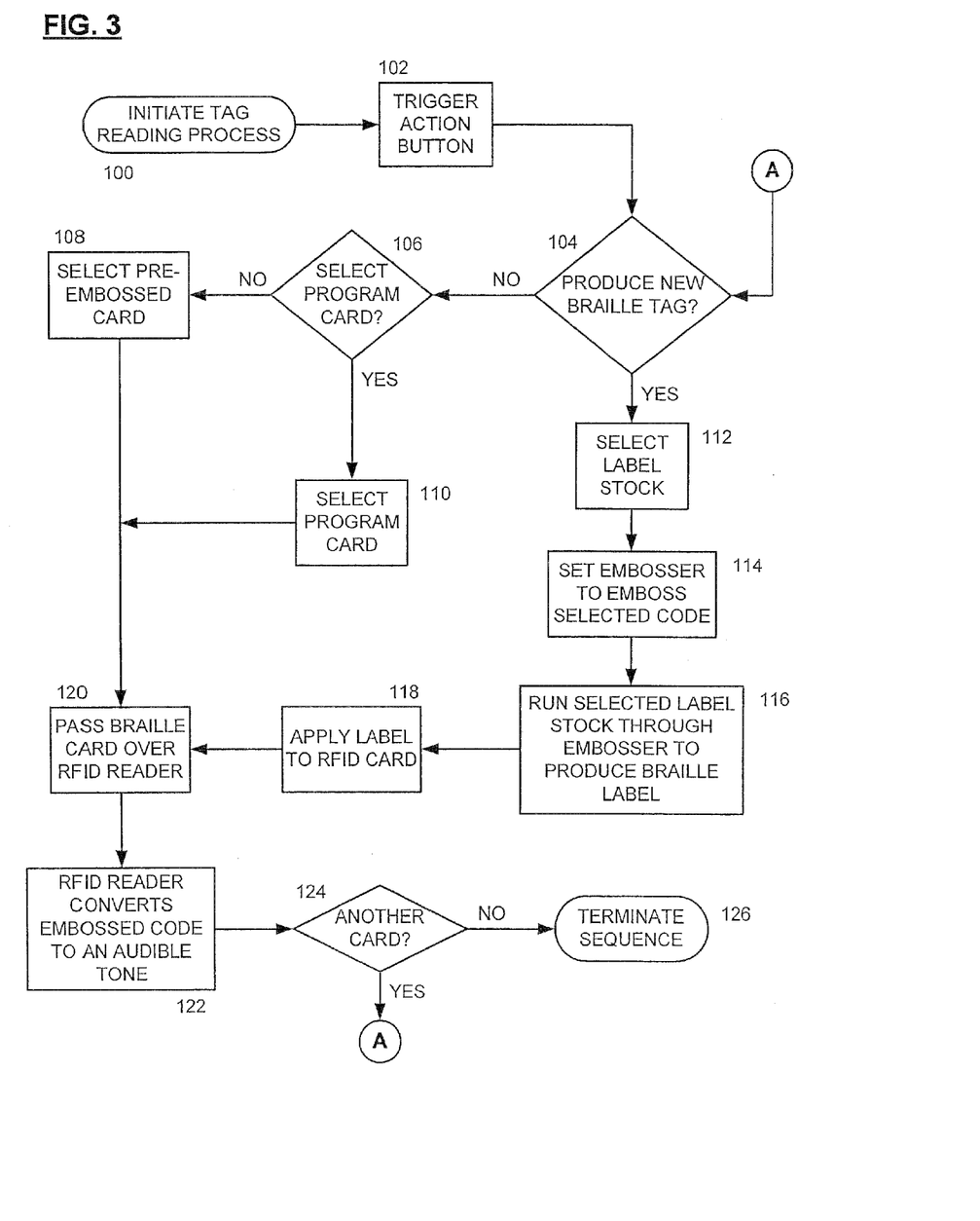
FIG. 3 is an upper level flowchart of the method of the present invention.

Turning to FIG. 3 there is shown an upper level flowchart of the method of the present invention.

The method flow of the present invention begins at step 100 where the tag reading process is initiated. The flow advances to step 102 where the system's action button is triggered which permits the system's micro-controller to be activated while readying the RFID reader to accept an input.

From step 102, the flow advances to a query at step 104 which asks if the system user desires to produce a new embossed Braille card. If the response to the query is "YES", then the flow advances to step 112 where the user selects a label/card stock before advancing to step 114 where an embosser is set-up so as to produce an embossed label at step 116 to be layered on top of the selected card at step 118. The embossing is indicative of a word, character, or function associated with the card and reflected in the RFID tag. The embossed card is thus produced at step 118 and is ready to be "read" by the RFID reader at step 120.

Returning to step 104, if the response to the query is "NO", then the flow advances to the query at step 106 which asks if a program card is to be selected. If the response to the query is "YES", then the flow advances to step 110 where a program card is selected. Program cards are indicative of functions or instructions, rather than words to be learned. Functions such as "ERASE" or "RECORD" allow the system to perform the function selected after the program card has been read by the RFID reader. After selecting the appropriate program card for the function to be performed, the flow advances to re-enter the flow in front of step 120. If, however, the response to the query at step 106 is "NO", then system user selects a pre-embossed "learning" card at step 108 which allows the user to use tactile touch to read the Braille coding on the card.

From step 108, step 110, and step 118, the flow advances to step 120 where the selected card is passed over the RFID reader. This action allows a series of coded signals to be transmitted to the system micro-controller, causing the micro-controller to organize a sound file corresponding to the series of coded signals. At step 122, the sound file is transmitted to an audio output device to convert the sound file automatically into the speech sound of the word or function embossed on the card. The flow advances from step 122 to a query at step 124.

The query at step 124 asks if the user wants to use another card. If the response to the query is "YES", then the flow advances along path A to re-enter the flow at step 104. However, if the response to the query at step 124 is "NO", then the flow advances to step 126 where the sequence is terminated.

In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A method for autonomous learning of Braille, by an unsighted user utilizing a micro-controller based system, said method further comprising the steps of:
    (a) activating, by an activation device, said micro-controller-based system;
    (b) selecting an embossed card from among a plurality of embossed tags, said embossed card further comprising:
        (i) a series of raised surfaces, wherein said series of raised indicia surfaces is representative of a Braille-based word or character; and
        (ii) an RFID tag which is capable of transmitting a signal indicative of said Braille-based word or character;
    (c) passing said embossed card over an RFID reader of said micro-controller-based system, said passing step causing said RFID tag to be read by said reader;
    (d) transmitting said reading as a coded signal from said reader to said micro-controller;
    (e) converting by said micro-controller, under control of a Braille application, said coded signal to an audible tone;
    (f) transmitting said audible tone through an audio output device for reception by said unsighted system user; and
    (g) integrating, at said micro-controller-based system, an interface port, wherein said interface port enables flashing of a set of firmware and enables downloading a set of new audible tone files into a database of said micro-controller-based system,
    wherein the plurality of embossed tags is expandable to include user created tags that are assignable to correspond to at least one of the new audible tone files.

2. The method of claim 1, wherein each one of said plurality of embossed cards comprises means for identifying said embossed tag from each one of said plurality of embossed cards.

3. The method of claim 1, wherein said embossed card is a MODE tag, said MODE tag causing said Braille application to switch from one mode to another and wherein each of said modes associates a word or a phrase with a single RFID tag, so that multiple words or phrases are associated with each tag.

4. The method of claim 1, wherein said audio output device is selected from the group comprising:
    (a) an embedded speaker;
    (b) at least one headphone;
    (c) a remote speaker;
    (d) a Bluetooth device; and
    (e) at least one earbud.

5. The method of claim 1, wherein said micro-controller based system further comprises a memory, said memory comprising a library of pre-recorded tones, each of said pre-recorded tones corresponding to a coded signal to be converted.

6. The method of claim 5, further comprising the step of activating a first mode within said micro-controller based system, said first mode for allowing said system user to record an audio input, said audio input being stored in said library as a pre-recorded tone.

7. The method of claim 5, further comprising the step of downloading an audio input, through an input port of said micro-controller based system, said audio input being stored in said library as a pre-recorded tone.

8. The method of claim 7, wherein said input port is an interface port.

9. A system for autonomous learning of Braille by an unsighted user, said system comprising:
(a) a micro-controller;
(b) a set of one or more embossed cards, wherein each one of said set of one or more embossed cards further comprises:
  (i) a series of raised surfaces, wherein said series of raised surfaces is representative of a Braille-based word or character; and
  (ii) an RFID tag which is capable of transmitting a signal indicative of said Braille-based word or character;
(c) an RFID reader, wherein passing said embossed card causes said RFID tag to be read by said reader;
(d) transmitting means for transmitting said reading of said RFID tag as a coded signal from said reader to said micro-controller;
(e) a Braille application, said Braille application for converting by said micro-controller, said coded signal to an audible tone; and
(f) an audio output device for transmitting said audible tone for reception by said unsighted system user;
(g) an activation device for activating said micro-controller; and
(h) at said micro-controller, an interface port, wherein said interface port is for flashing a set of firmware and for downloading a set of new audible tone files into said micro-controller
wherein the set of one or more embossed cards is expandable to include user created tags that are assignable to correspond to at least one of the new audible tone files.

10. The system of claim 9, wherein each one of said plurality of embossed cards comprises means for identifying said embossed card from each one of said plurality of embossed cards; and each one of said plurality of embossed cards further comprises Braille coding indicative of a word to be learned by said system user.

11. The system of claim 9, wherein said embossed card is a MODE card, said MODE card causing said Braille application to switch from one mode to another and wherein each of said modes associates a word or a phrase with a single RFID tag, so that multiple words or phrases are associated with each tag.

12. The system of claim 9, wherein said audio output device is selected from the group comprising:
(a) an embedded speaker;
(b) at least one headphone;
(c) a remote speaker;
(d) a Bluetooth device; and
(e) at least one earbud.

13. The system of claim 9, wherein said micro-controller based system further comprises a memory, said memory comprising a library of pre-recorded tones, each of said pre-recorded tones corresponding to a coded signal to be converted.

14. The system of claim 9, said system further comprising an audio input port, said audio input port for downloading an audio input, said audio input to be stored in said library as a pre-recorded tone.

15. A method for autonomous teaching of Braille utilizing a micro-controller based system, said method further comprising the steps of:
(a) activating, by an activation device, said micro-controller-based system;
(b) selecting an embossed card from among a plurality of embossed cards, said embossed card comprising an RFID tag which is capable of transmitting a signal indicative of a set of contents of said embossed card;
(c) passing said embossed card over an RFID reader of said micro-controller-based system, said passing step causing said RFID tag to be read by said reader;
(d) transmitting said reading as a coded signal from said reader to said micro-controller;
(e) converting by said micro-controller, under control of a Braille application, said coded signal to an audible tone;
(f) transmitting said audible tone through an audio output device for reception by a system user; and
(g) integrating, at said micro-controller-based system, an interface port, wherein said interface port enables flashing of a set of firmware and enables downloading a set of new audible tone files into a database of said micro-controller-based system,
wherein the plurality of embossed tags is expandable to include user created tags that are assignable to correspond to at least one of the new audible one files.

16. The method of claim 15, wherein each one of said plurality of embossed cards comprises means for identifying said embossed card from each one of said plurality of embossed cards; and each one of said plurality of embossed cards further comprises Braille coding indicative of a word to be learned by said system user.

17. The method of claim 15, wherein said audio output device is selected from the group comprising:
(a) an embedded speaker;
(b) at least one headphone;
(c) a remote speaker;
(d) a Bluetooth device; and
(e) at least one earbud.

18. The method of claim 15, wherein said micro-controller based system further comprises a memory, said memory comprising a library of pre-recorded tones, each of said pre-recorded tones corresponding to a coded signal to be converted.

19. The method of claim 18, further comprising the step of activating a first mode within said micro-controller based system, said first mode for allowing said system user to record an audio input, said audio input being stored in said library as a pre-recorded tone.

20. The method of claim 18, further comprising the step of downloading an audio input, through an input port of said micro-controller based system, said audio input being stored in said library as a pre-recorded tone.

21. The method of claim 20, wherein said input port is selected from the group comprising:
(a) an interface port; and
(b) a removable memory storage media.

22. The method of claim 15, said method further comprising the steps of:
(c) providing power management means within said micro-controller based system;
(d) interfacing said power management means with a power supply disposed within said micro-controller based system; and
(e) arranging said power management means to conserve power within said micro-controller based system so as to remain in a sleep mode until activated.

* * * * *